US012439271B2

United States Patent
Isci et al.

(10) Patent No.: US 12,439,271 B2
(45) Date of Patent: Oct. 7, 2025

(54) MACHINE-LEARNING-BASED WIRELESS PLANNING USING ANTENNA RADIATION PATTERNS

(71) Applicant: AT&T Intellectual Property I, L.P., Atlanta, GA (US)

(72) Inventors: Serkan Isci, Plainsboro, NJ (US); Krystian Czapiga, Hillsborough, NJ (US); Yaron Kanza, Fair Lawn, NJ (US); James Klosowski, Ridgefield, CT (US); Velin Kounev, Weehawken, NJ (US); Gopalakrishnan Meempat, East Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 533 days.

(21) Appl. No.: 18/051,622

(22) Filed: Nov. 1, 2022

(65) Prior Publication Data
US 2024/0147251 A1    May 2, 2024

(51) Int. Cl.
*H04W 16/28*      (2009.01)
*H04W 16/18*      (2009.01)

(52) U.S. Cl.
CPC ........... *H04W 16/18* (2013.01); *H04W 16/28* (2013.01)

(58) Field of Classification Search
CPC .............................. H03W 16/18; H04W 16/28
See application file for complete search history.

(56) References Cited

U.S. PATENT DOCUMENTS

| | | | |
|---|---|---|---|
| 2012/0169543 A1* | 7/2012 | Sharma | H01Q 9/0421 342/458 |
| 2022/0022145 A1* | 1/2022 | Raghavan | H04W 72/0453 |
| 2022/0377568 A1* | 11/2022 | Kanza | G06T 7/70 |

OTHER PUBLICATIONS

Taghvaee, Hamidreza et al. "Radiation Pattern Prediction for Metasurfaces: A Neural Network-Based Approach." Sensors (Basel, Switzerland) vol. 21,8 2765. Apr. 14, 2021.

\* cited by examiner

*Primary Examiner* — Michael T Vu (57) ABSTRACT

In one example, a method performed by a processing system including at least one processor includes creating a geospatial model of an environment in which a cellular network is to be deployed, transforming, for each cellular antenna of a proposed antenna layout of the cellular network, a radiation pattern of the each cellular antenna into a signal strength array, to create a plurality of signal strength arrays, augmenting, for each signal strength array of the plurality of signal strength arrays, the each signal strength array with at least one parameter of a corresponding cellular antenna of the proposed antenna layout and at least one value describing the environment in which the cellular network is to be deployed, and estimating a coverage of the proposed antenna layout based on the signal strength array, as augmented, using a machine learning model.

20 Claims, 5 Drawing Sheets

MACHINE-LEARNING-BASED WIRELESS PLANNING USING ANTENNA RADIATION PATTERNS

The present disclosure relates generally to cellular networks, and relates more particularly to devices, non-transitory computer-readable media, and methods for incorporating antenna radiation patterns in machine learning-based wireless planning.

BACKGROUND

Planning a cellular network is a complex task that involves, among other activities, determining where to position the cellular antennas in a way that maximizes cellular coverage in the planned area and minimizes interference between antennas with similar transmission frequencies. Within this context, "coverage" is understood to refer to the ability of a mobile device to complete a call using a cellular network (or a partner network). The coverage of a cellular antenna is a complex pattern that is affected by parameters of the antenna (e.g., antenna location, antenna height, antenna direction or azimuth, antenna tilt with respect to the horizon, antenna transmission frequency, antenna transmission power, and antenna transmission pattern) and features of the geospatial environment (e.g., presence, size, and locations of buildings, trees, terrain, and other obstacles that may block, reflect, or reduce the power of cellular transmissions). For accurate computation of the coverage area of a cellular antenna, the inputs to the computation must include both the antenna parameters and the features of the geospatial environment.

SUMMARY

In one example, the present disclosure describes a device, computer-readable medium, and method for incorporating antenna radiation patterns in machine learning-based wireless planning. For instance, in one example, a method performed by a processing system including at least one processor includes creating a geospatial model of an environment in which a cellular network is to be deployed, transforming, for each cellular antenna of a proposed antenna layout of the cellular network, a radiation pattern of the each cellular antenna into a signal strength array, to create a plurality of signal strength arrays, augmenting, for each signal strength array of the plurality of signal strength arrays, the each signal strength array with at least one parameter of a corresponding cellular antenna of the proposed antenna layout and at least one value describing the environment in which the cellular network is to be deployed, and estimating a coverage of the proposed antenna layout based on the signal strength array, as augmented, using a machine learning model.

In another example, a non-transitory computer-readable medium stores instructions which, when executed by a processing system, including at least one processor, cause the processing system to perform operations. The operations include creating a geospatial model of an environment in which a cellular network is to be deployed, transforming, for each cellular antenna of a proposed antenna layout of the cellular network, a radiation pattern of the each cellular antenna into a signal strength array, to create a plurality of signal strength arrays, augmenting, for each signal strength array of the plurality of signal strength arrays, the each signal strength array with at least one parameter of a corresponding cellular antenna of the proposed antenna layout and at least one value describing the environment in which the cellular network is to be deployed, and estimating a coverage of the proposed antenna layout based on the signal strength array, as augmented, using a machine learning model.

In another example, a device includes a processing system including at least one processor and a computer-readable medium storing instructions which, when executed by the processing system, cause the processing system to perform operations. The operations include creating a geospatial model of an environment in which a cellular network is to be deployed, transforming, for each cellular antenna of a proposed antenna layout of the cellular network, a radiation pattern of the each cellular antenna into a signal strength array, to create a plurality of signal strength arrays, augmenting, for each signal strength array of the plurality of signal strength arrays, the each signal strength array with at least one parameter of a corresponding cellular antenna of the proposed antenna layout and at least one value describing the environment in which the cellular network is to be deployed, and estimating a coverage of the proposed antenna layout based on the signal strength array, as augmented, using a machine learning model.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides devices, non-transitory computer-readable media, and methods for incorporating antenna radiation patterns in machine learning-based wireless planning. As discussed above, planning a cellular network is a complex task that involves, among other activities, determining where to position the cellular antennas in a way that maximizes cellular coverage in the planned area and minimizes interference between antennas with similar transmission frequencies. The coverage of a cellular antenna is a complex pattern that is affected by parameters of the antenna (e.g., antenna location, antenna height, antenna direction or azimuth, antenna tilt with respect to the horizon, antenna transmission frequency, antenna transmission power, and antenna transmission pattern) and features of the geospatial environment (e.g., presence, size, and locations of buildings, trees, terrain, and other obstacles that may block, reflect, or reduce the power of cellular transmissions). For accurate computation of the coverage area of a cellular antenna, the inputs to the computation must include both the antenna parameters and the features of the geospatial environment.

Typically, the coverage of each antenna is estimated when positioning cellular antennas and testing network layouts. The estimated coverage may be computed based on a propagation model of the electromagnetic transmission and a model of the geospatial obstacles in the deployment area. The computation of an antenna's estimated coverage is becoming even more critical and more computationally demanding for newer generations of cellular networks, including fifth generation (5G) networks, because the shortwaves (e.g., 5G or millimeter waves) in these newer generation networks are often blocked by obstacles in the geospatial environment.

Current tools for computing an antenna's estimated coverage typically rely on ray tracing algorithms. A ray tracing algorithm emits rays (or photons) from the cellular antenna in all (or in only selected) directions and computes the intersection of these rays with obstacles in the environment (e.g., geospatial features such as buildings, trees, terrain, and the like). These obstacles may reflect the emitted rays by sending new rays from the hit point in a random direction. The hit points of direct and reflected rays are then collected to create the resultant coverage pattern. Creation of the resultant coverage pattern may be performed while reducing the power of the transmission based on the distance. To create an accurate coverage pattern, the ray tracing algorithm will typically emit millions of rays and apply computations that are laborious and time consuming. For instance, computing the coverage pattern for even a single sector of a cellular antenna using a state of the art ray tracing algorithm may take as much as forty-five seconds. As such, ray tracing does not scale well for effective radio access network (RAN) planning in which thousands of antennas (each antenna including three sectors) may be deployed.

Examples of the present disclosure use machine learning to compute, in near real time, the coverage of a cellular antenna that uses shortwaves in an urban area, while taking the radiation power of the antenna into account. More particularly, examples of the present disclosure train and deploy a machine learning model, such as a neural network, to compute the coverage and interference of a cellular antenna deployed in a specified area, while taking complex antenna radiation patterns into account. The machine learning model may be trained using a set of trainings data that is generated using a ray tracing algorithm. The use of machine learning model to estimate the coverage reduces the computation time per-antenna from dozens of seconds (as is typical when performing the computations using ray tracing algorithms) to milliseconds. This supports planning of large areas and testing a large number of parameters per antenna when designing an optimal cellular network deployment.

Using machine learning to compute the estimated coverage of a proposed network layout may therefor revolutionize network planning by providing planners with a tool to quickly and efficiently examine a large variety of deployment options and select the most optimal layout among the evaluated layouts. For instance, examples of the present disclosure could be used to efficiently test the effects of small changes in the position and/or tilt of antennas and to compute the effects of environmental changes on coverage. The ability to test such changes in a quick and reliable manner supports optimization of antenna positioning and provides a more reliable network (i.e., a network with better coverage) with lower installation and maintenance costs.

Moreover, examples of the present disclosure provide a valuable tool for planners of high-frequency cellular networks, including 5G networks, because 5G networks tend to be highly affected by geospatial obstacles. Moreover, the ability to evaluate in real time the effects of antenna deployment locations may significantly improve the planning of ad hoc cellular networks and may lay the foundations for planning dynamic cellular networks in which antennas may be mounted on moving vehicles such as cars, drones, and the like. These and other aspects of the present disclosure are described in greater detail below in connection with the examples of FIGS. 1-7.

Figure 1:
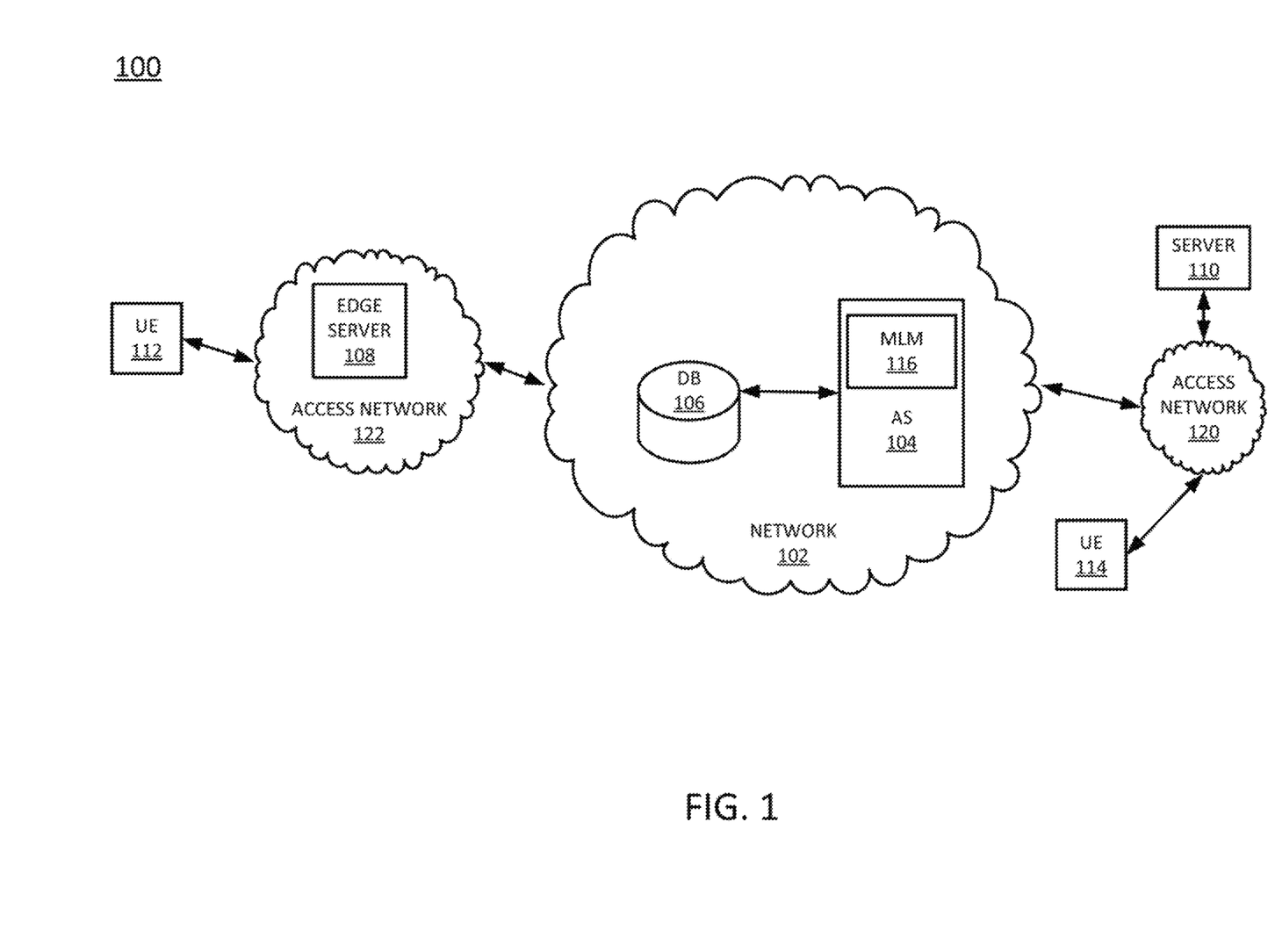
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, a streaming service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 7:
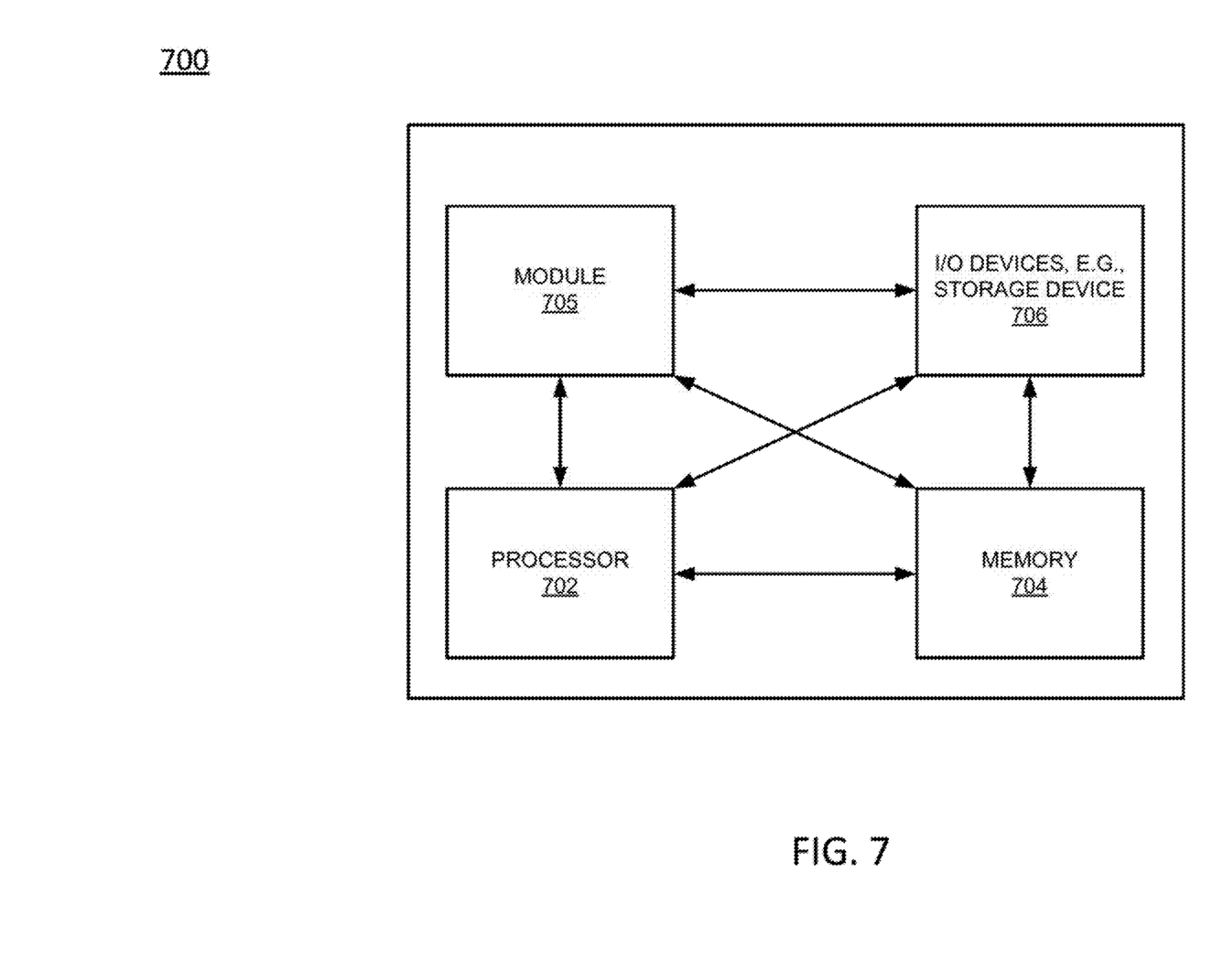
FIG. 7 depicts a high-level block diagram of a computing device specifically programmed to perform the functions described herein.

In accordance with the present disclosure, network 102 may include an application server (AS) 104, which may comprise a computing system or server, such as computing system 700 depicted in FIG. 7, and may be configured to provide one or more operations or functions in connection with examples of the present disclosure for incorporating antenna radiation patterns in machine learning-based wireless planning. The network 102 may also include at least one database DB 106 that is communicatively coupled to the AS 104. For instance, the DB may store proposed antenna layouts and associated data for cellular network deployments (e.g., antenna locations, heights, tilts, transmission frequencies, and the like, as well as geospatial models of environments in which the proposed antenna layouts may be deployed), as discussed in greater detail below. The DB may also store training data for a machine learning model where the training data may include antenna radiation patterns that are generated using ray tracing algorithms, as also discussed in further detail below.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 7 and discussed below) or multiple computing devices collectively configured to perform various steps, functions, and/or operations in accordance with the present disclosure. Thus, although only a single application server (AS) 104 and a single database (DB) 106 are illustrated, it should be noted that any number of servers and any number of databases may be deployed. Furthermore, these servers and databases may operate in a distributed and/or coordinated manner as a processing system to perform operations in connection with the present disclosure.

In one example, AS 104 may comprise a centralized network-based server for incorporating antenna radiation patterns in machine learning-based wireless planning. For instance, the AS 104 may host a machine learning model (MLM) 116, such as a neural network or a deep learning model, which can be trained to estimate the coverage and interference of a proposed antenna layout for a cellular network. The AS 104 may access training data for the machine learning model 116, where the training data may include coverage patterns that have been estimated using ray tracing algorithms and transformed into multi-dimensional arrays (as discussed in further detail below in connection with FIG. 2).

Once trained, the machine learning model 116 may be used to estimate the coverage and interference of a proposed antenna layout for a cellular network. For instance, a first multi-dimensional array may be provided as an input to the trained machine learning model 116, where the first multi-dimensional array may include antenna radiation patterns for a plurality of cellular antennas of a proposed antenna layout, a plurality of values related to parameters of the plurality of cellular antennas, and a plurality of values related to geospatial obstacles that may be present in the environment in which the proposed antenna layout is to be deployed. As an output, the machine learning model 116 may generate a second multi-dimensional array, where the second multi-dimensional array may estimate the coverage and interference for each cellular antenna of the proposed antenna layout. Using machine learning to estimate the coverage and inference, rather than using conventional ray tracing algorithms, may significantly speed up the evaluation of the proposed antenna layout.

In one example, AS 104 may comprise a physical storage device (e.g., a database server) to store training data for the machine learning model 116, proposed antenna layouts, and associated data for cellular network deployments.

In one example, the DB 106 may store training data for the machine learning model 116, proposed antenna layouts, and associated data for cellular network deployments, and the AS 104 may retrieve individual training data set for the machine learning model 116, proposed antenna layouts, and associated data for cellular network deployments from the DB 106 when needed. For ease of illustration, various additional elements of network 102 are omitted from FIG. 1.

Figure 2:
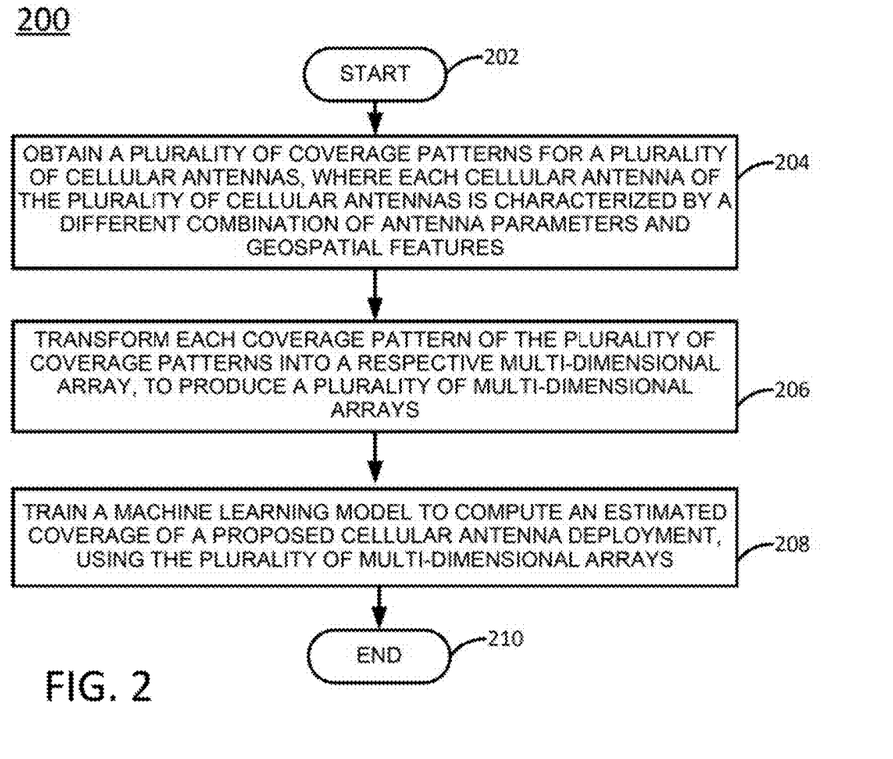
FIG. 2 illustrates a flowchart of an example method for incorporating antenna radiation patterns in machine learning-based wireless planning, in accordance with the present disclosure.
Figure 3:
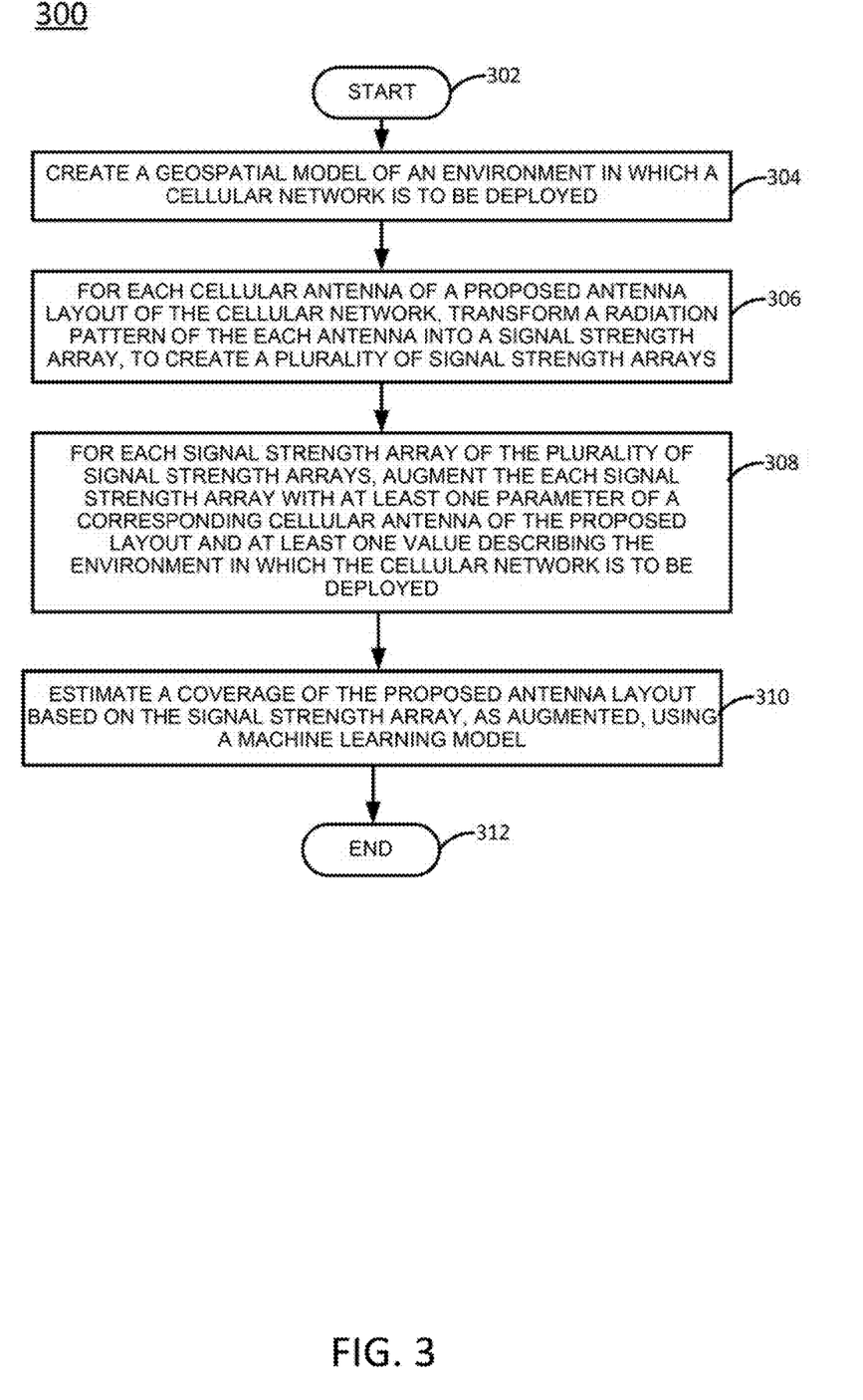
FIG. 3 illustrates a flowchart of an example method for incorporating antenna radiation patterns in machine learning-based wireless planning, in accordance with the present disclosure.

In one example, access network 122 may include an edge server 108, which may comprise a computing system or server, such as computing system 700 depicted in FIG. 7, and may be configured to provide one or more operations or functions for incorporating antenna radiation patterns in machine learning-based wireless planning, as described herein. For instance, an example method 200 for training a machine learning model to estimate the coverage and interference of a proposed antenna layout is illustrated in FIG. 2 and described in greater detail below, while an example method 300 for estimating the coverage and interference of a proposed antenna layout using machine learning is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., a user endpoint device 112, and access network 122 may be in communication with one or more devices, e.g., a user endpoint device 114. Access networks 120 and 122 may transmit and receive communications between server 110, user endpoint devices 112 and 114, application server (AS) 104, other components of network 102, devices reachable via the Internet in general, and so forth. In one example, the user endpoint devices 112 and 114 may comprise mobile devices, cellular smart phones, wearable computing devices (e.g., smart glasses, virtual reality (VR) headsets or other types of head mounted displays, or the like), laptop computers, tablet computers, Internet of Things (IoT) devices, or the like (broadly "extended reality devices"). In one example, each of the user endpoint devices 112 and 114 may comprise a computing system or device, such as computing system 700 depicted in FIG. 7, and may be configured to provide various data for planning, designing, and optimizing cellular networks. For instance, any of the user endpoint devices 112 and 114 may be used to collect geospatial data about an environment in which a cellular network is to be deployed, to design proposed layouts of cellular antennas within the environment, and/or to modify parameters of the cellular antennas included in the proposed layouts.

In one example, server 110 may comprise a network-based server for incorporating antenna radiation patterns in machine learning-based wireless planning. In this regard, server 110 may comprise the same or similar components as those of AS 104 and may provide the same or similar functions. Thus, any examples described herein with respect to AS 104 may similarly apply to server 110, and vice versa.

In an illustrative example, a system for incorporating antenna radiation patterns in machine learning-based wireless planning may be provided via AS 104 and edge server 108. In one example, a user may engage an application on user endpoint device 112 to establish one or more sessions with a cellular network planning and optimization tool, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of an example method 200 for incorporating antenna radiation patterns in machine learning-based wireless planning, in accordance with the present disclosure. In particular, the method 200 provides a method for training a machine learning model to estimate the coverage and interference for a cellular antenna. In one example, the method 200 may be performed by an application server, such as the AS 104 or server 110 illustrated in FIG. 1. However, in other examples, the method 200 may be performed by another device, such as the processor 702 of the system 700 illustrated in FIG. 7. For the sake of example, the method 200 is described as being performed by a processing system.

The method 200 begins in step 202. In step 204, the processing system may obtain a plurality of coverage patterns for a plurality of cellular antennas, where each cellular antenna of the plurality of cellular antennas is characterized by a different combination of antenna parameters and geospatial features.

In step 206, the processing system may transform each coverage pattern of the plurality of coverage patterns into a respective multi-dimensional array, to produce a plurality of multi-dimensional arrays.

In step 208, the processing system may train a machine learning model to compute an estimated coverage of a proposed cellular antenna deployment, using the plurality of multi-dimensional arrays.

In one example, the machine learning model comprises a neural network, such as a convolutional neural network (CNN), or other deep learning model. In one example, each input to the machine learning model may comprise a first multi-dimensional array. For instance, the first multi-dimensional array may comprise a 256×256×9 array. In this case, there are nine parameters for each pixel that specify values related to the pixel, where the values include geospatial values and antenna parameters. Each output of the machine learning model may comprise a second multi-dimensional array. For instance, the second multi-dimensional array may comprise a 256×256×2 array, where two values—namely, signal strength and interference—are specified for each pixel. The interference value indicates how much overlap exists between the signals from two different cellular antennas with similar frequencies. When each pixel represents a 4×4 m 2 cell, a 256×256 array represents one square kilometer.

In one example of the training of step 208, the signal strength and interference values of the second multidimensional array are computed using a ray tracing algorithm, and the machine learning model is trained over the computed signal strength and interference values.

Once the machine learning model has been trained in step 208, the processing system may use the machine learning model to compute the estimated coverage of a proposed cellular antenna deployment, as discussed in further detail below in connection with FIG. 3.

The method 200 may end in step 210.

To further aid in understanding the present disclosure, FIG. 3 illustrates a flowchart of an example method 300 for incorporating antenna radiation patterns in machine learning-based wireless planning, in accordance with the present disclosure. In particular, the method 300 provides a method for estimating the coverage and interference of a cellular antenna using machine learning. In one example, the method 300 may be performed by an application server, such as the AS 104 or server 110 illustrated in FIG. 1. However, in other examples, the method 300 may be performed by another device, such as the processor 702 of the system 700 illustrated in FIG. 7. For the sake of example, the method 300 is described as being performed by a processing system.

The method 300 begins in step 302. In step 304, the processing system may create a geospatial model of an environment in which a cellular network is to be deployed.

In one example, the geospatial model partitions the environment into square cells of equal size. In one example, each cell represents a four meter by four meter section of the environment. In the geospatial model, each cell is represented by a pixel. The resolution of the geospatial model may vary, such that each pixel of the geospatial model may represent a larger cell (e.g., lower resolution) or a smaller cell (e.g., higher resolution). In one example, each pixel of the geospatial model is associated with a value that indicates the height above sea level of the corresponding cell and a classification that specifies the behavior of a ray traveling via an obstacle that is present in the cell. For instance, where the obstacle is a building, the ray may be reflected; or where the obstacle is a tree, the ray may continue through the tree while losing power.

In a ray tracing algorithm, the classification is typically used for computing the path and the power reduction of each individual ray. However, according to the present disclosure, the machine learning model may be trained to receive an array of classification values and to compute a corresponding estimated signal strength for a corresponding pixel of the geospatial model.

In step 306, the processing system may, for each cellular antenna of a proposed antenna layout of the cellular network, transform a radiation pattern of the each antenna into a signal strength array, to create a plurality of signal strength arrays (e.g., one signal strength array for each cellular antenna of the proposed layout).

Figure 4:
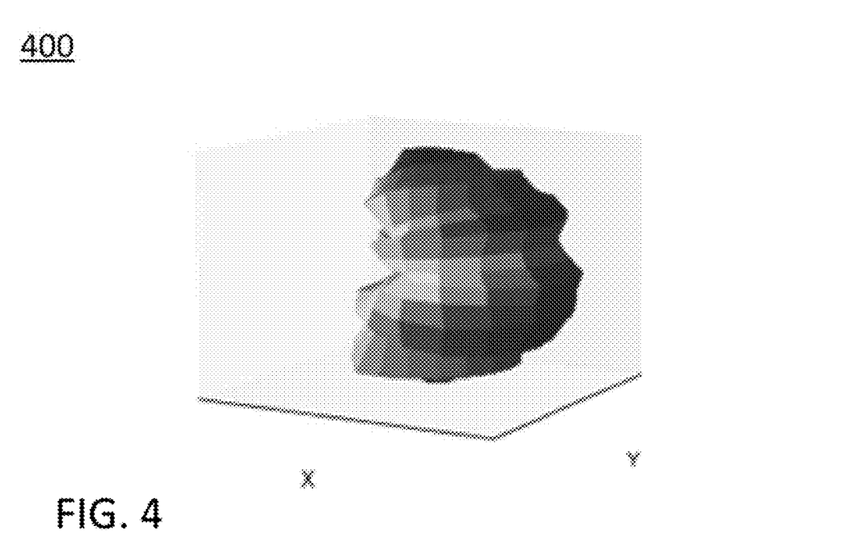
FIG. 4 illustrates a three-dimensional mesh representing an example radiation pattern of an example cellular antenna.

The radiation pattern of a cellular antenna may be represented by a three-dimensional shape around the center of the cellular antenna. In each direction, the size of the vector from the center of the cellular antenna to the face of the three-dimensional shape indicates the signal strength of the cellular antenna in that direction. FIG. 4, for instance, illustrates a three-dimensional mesh representing an example radiation pattern 400 of an example cellular antenna.

Figure 5:
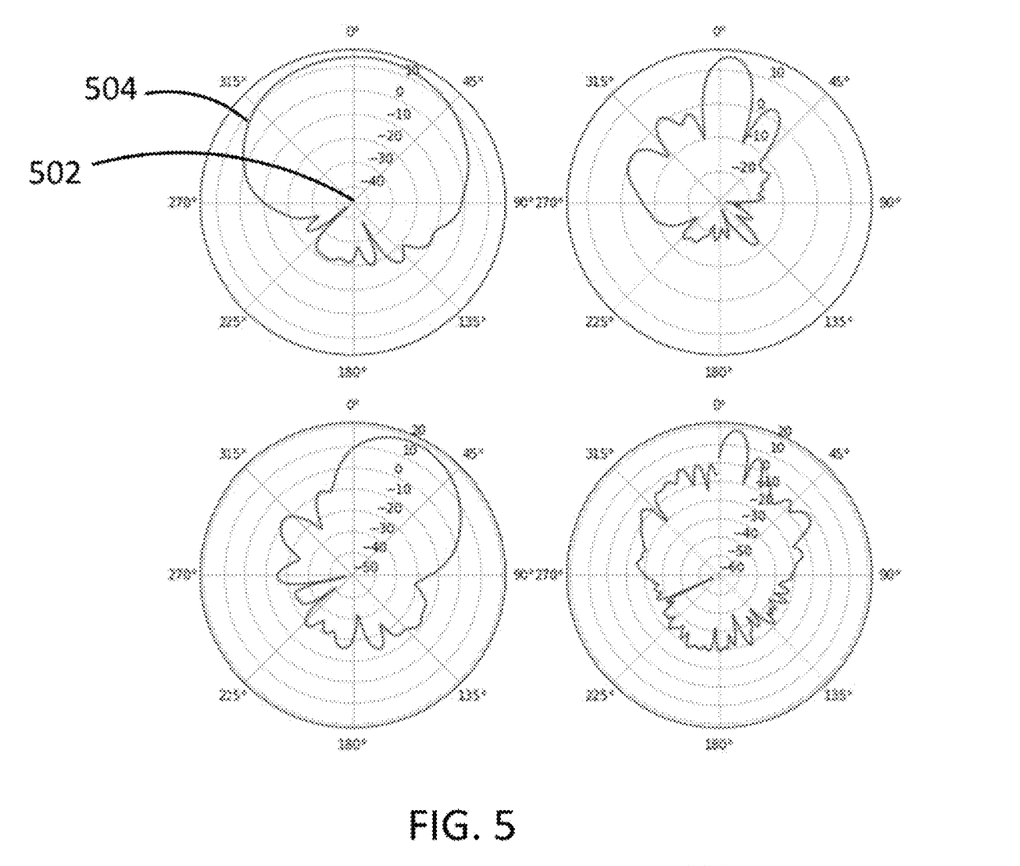
FIG. 5 illustrates a plurality of example two-dimensional maps representing radiation patterns for two different example cellular antennas.

In one example, the radiation pattern of a cellular antenna is transformed into a signal strength array by first computing two two-dimensional maps of the three-dimensional shape (e.g., one map each for the northern and southern hemispheres), to indicate the signal strength of the cellular antenna in different directions. FIG. 5, for instance, illustrates a plurality of example two-dimensional maps representing radiation patterns for two different example cellular antennas. Specifically, the top two maps represent radiation patterns for a first example antenna, while the bottom two maps represent radiation patterns for a second example antenna. The left two maps represent horizontal cuts of the three-dimensional radiation patterns, while the right two maps represent vertical cuts of the same three-dimensional radiation patterns. In FIG. 5, each radiation pattern comprises sixty nine cells.

In the example of FIG. 5, for each direction (azimuth), the distance from the center of the circle (indicated by 502 in the top left map, and located similarly in the remaining maps) to the edge of the pattern (indicated by 504 in the top left map, and located similarly in the remaining maps) indicates the transmission strength of the corresponding cellular antenna in that direction. In other words, for each vector from the center of a cellular antenna to a given direction, the direction of the vector can be represented in a spherical coordinate system using two values: the polar angle $\varphi$ and the azimuth angle $\theta$. In one example, the two two-dimensional maps of the signal strength values that are created for each three-dimensional pattern shape are created at a predefined resolution (e.g., 9×9 or other resolutions).

As discussed in further detail below, the radiation pattern of each cellular antenna in the proposed antenna layout is combined with one or more values of various antenna parameters (e.g., antenna location, antenna height, antenna direction or azimuth, antenna tilt with respect to the horizon, antenna transmission frequency, antenna transmission power, and antenna transmission pattern) and one or more features of the geospatial environment (e.g., presence, size, and locations of buildings, trees, terrain, and other obstacles that may block, reflect, or reduce the power of cellular transmissions). The two two-dimensional maps, combined with the antenna parameter values and geospatial environment features, may form a multi-dimensional array from which the coverage and interference of a corresponding cellular antenna may be estimated.

Figure 6A:
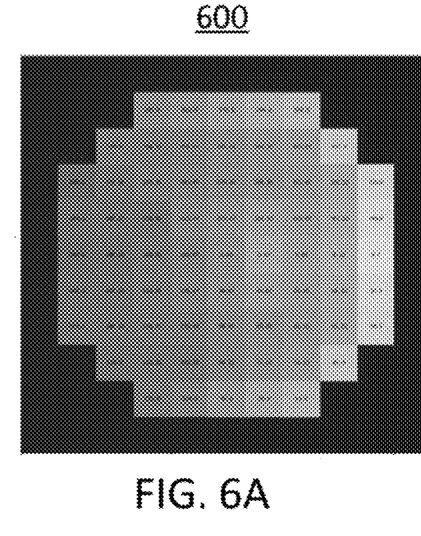
FIG. 6A illustrates an example signal strength array that may be constructed from the two-dimensional maps for the first example antenna of FIG. 5.
Figure 6B:
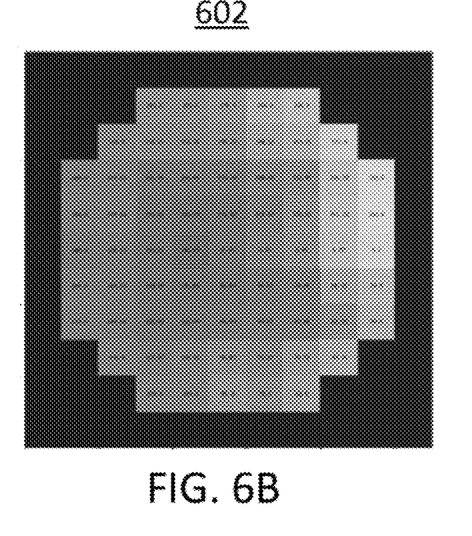
FIG. 6B illustrates an example signal strength array that may be constructed from the two-dimensional maps for the second example antenna of FIG. 5.

FIG. 6A illustrates an example signal strength array 600 that may be constructed from the two-dimensional maps for the first example antenna (i.e., the top two maps of FIG. 5), while FIG. 6B illustrates an example signal strength array 602 that may be constructed from the two-dimensional maps for the second example antenna (i.e., the bottom two maps of FIG. 5). In one example, a pair of two-dimensional radiation pattern maps may be transformed into a signal strength array as follows.

In one example, for each antenna, there are two two-dimensional transmission patterns: one horizontal and one vertical. Based on the two two-dimensional transmission patterns, there are two transmission strength: one for the upper hemisphere and one for the lower hemisphere.

For the top two radiation patterns in FIG. 5, the top of the array (the northern part) is expected to be strong, because the left top pattern of FIG. 5 is far from the center towards the north. The right top pattern of FIG. 5 shows that the top hemisphere will have a strong signal, but the bottom hemisphere will not have strong power. Similarly, the bottom two patterns of FIG. 5 show that the right-up direction in the top hemisphere has strong signal, but the other directions (and in particular the bottom hemisphere) are low.

The two-dimensional map of the vertical cut of the antenna radiation pattern provides a mapping of the azimuth angle to the signal strength in the indicated direction at the corresponding horizontal cut. The horizontal cut of the antenna radiation pattern provides a mapping of the polar angle to the signal strength in the indicated direction at the vertical cut. It should be noted that in three-dimensional terms, the horizontal cut and the vertical cut are the results of changing the yaw and pitch values, in correspondence.

The signal strength array of FIG. 6A presents, for each pair of azimuth angle and polar angle, an estimated signal strength (where the lighter shading indicates a stronger signal and darker shading indicates a weaker signal). In one example, the signal strength may be computed by multiplying the signal strength values for the azimuth and polar angles. For instance, for (0,0), the signal strength for direction 0 in the horizontal cut is multiplied by the signal strength for direction 0 in the vertical cut, where the signal strengths may be normalized to fall within the range of [0,1]. More specifically, the signal strength may be computed as the bilinear interpolation between the vertical and horizontal profiles The resultant value may be presented as the array 600. For any given pair of azimuth and polar angles, the computation for the signal strength may be similarly computed.

In step 308, the processing system may, for each signal strength array of the plurality of signal strength arrays, augment the each signal strength array with at least one parameter of a corresponding cellular antenna of the proposed layout and at least one value describing the environment in which the cellular network is to be deployed.

In one example, the signal strength array, as augmented, may comprise a first multi-dimensional array. This first multi-dimensional array may contain the geospatial and antenna parameters for a 256×256 grid. As discussed above, when each pixel of the first multi-dimensional array represents a 4×4 m 2 cell, a 256×256 array represents one square kilometer.

For each pixel of the signal strength array, as augmented, the following values representing one or more of the geospatial parameters may be used to augment the signal strength array and produce the first multi-dimensional array: elevation (i.e., height above sea level) at the pixel and clutter (i.e., type of obstacle at the pixel, such as building, tree, vegetation, ground, etc.). Additionally, if an antenna is present at the pixel, the following one or more antenna parameters may also be used to augment the signal strength array: antenna azimuth, antenna height, antenna tilt (where azimuth, height, and tilt collectively specify the antenna's location and direction), sector (where an antenna is typically partitioned into three sectors, and the sector number helps distinguish between parameters of different sectors of the same antenna), and the frequency of the electromagnetic radiation emitted by the antenna. Thus, in combination with the two two-dimensional maps that are merged to form the signal strength array (where each two-dimensional map may represent the antenna radiation pattern for one hemisphere of the antenna as an array of sixty nine values), nine total parameters may be combined to form the signal strength array, as augmented (e.g., the first multi-dimensional array).

In step 310, the processing system may estimate a coverage of the proposed antenna layout based on the signal strength array, as augmented, using a machine learning model.

As discussed above, in one example, the machine learning model may comprise a deep learning model or a neural network, such as a CNN. In one example, the output of the machine learning model (i.e., the estimate of the coverage of the proposed antenna layout) may be provided as a second multi-dimensional array. The second multidimensional array may comprise two values per pixel: a first value representing signal strength at the pixel and a second value representing a level of interference at the pixel (where the level of interference indicates whether there are signals with interfering frequencies from two or more different antennas present at the pixel). The method 300 may end in step 312.

Although not expressly specified above, one or more steps of the method 200 or method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

By using machine learning as disclosed above, the time required to estimate the coverage and interference of a proposed antenna layout for a cellular network can be drastically reduced in comparison to conventional ray tracing techniques. For instance, experimental results have shown that the proposed approach can estimate the coverage an interference for one square kilometer of a proposed antenna layout in approximately four milliseconds, while the same computation takes approximately one minute using a ray tracing algorithm. Moreover, the accuracy of the disclosed approach is comparable to the accuracy of conventional ray tracing techniques.

Although examples of the present disclosure are discussed within the context of planning, designing, and optimizing wireless networks, the techniques disclosed herein may have additional applications beyond wireless networks. For instance, the techniques disclosed herein could be applied to other types of electromagnetic transmissions where transmissions with similar frequencies may interfere with each other.

Additionally, quick computation of coverage could support real time ad-hoc changes in antennas, allowing for better support of changing needs for cellular coverage. For instance, some cellular antennas may be able to change their positions quickly (e.g., due to the antennas being mounted on moving vehicles such as cars, drones, or balloons) or may be able to change their tilt and transmission power in real time. Fast computation of coverage could enable real-time changes in the antenna positions, tilts, and transmission ranges to support temporary increases in demand for cellular services in particular areas (e.g., during natural disasters, emergencies, concerts, sports, and other events that temporarily bring larger numbers of people into the particular areas, and the like). In other words, the techniques disclosed herein could support self-organizing networks (SONs).

Additionally, previously unknown obstacles could be detected in a given area by examining the difference between estimated signal strength for the given area and actual measured signal strength for the given area.

FIG. 7 depicts a high-level block diagram of a computing device specifically programmed to perform the functions described herein. For example, any one or more components or devices illustrated in FIG. 1 or described in connection with the method 200 or the method 300 may be implemented as the system 700. For instance, a server (such as might be used to perform the method 200 or the method 300) could be implemented as illustrated in FIG. 7.

As depicted in FIG. 7, the system 700 comprises a hardware processor element 702, a memory 704, a module 705 for incorporating antenna radiation patterns in machine learning-based wireless planning, and various input/output (I/O) devices 706.

The hardware processor 702 may comprise, for example, a microprocessor, a central processing unit (CPU), or the like. The memory 704 may comprise, for example, random access memory (RAM), read only memory (ROM), a disk drive, an optical drive, a magnetic drive, and/or a Universal Serial Bus (USB) drive. The module 705 for incorporating antenna radiation patterns in machine learning-based wireless planning may include circuitry and/or logic for performing special purpose functions relating to cellular network planning. The input/output devices 706 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 705 for incorporating antenna radiation patterns in machine learning-based wireless planning (e.g., a software program comprising computer-executable instructions) can be loaded into memory 704 and executed by hardware processor element 702 to implement the steps, functions or operations as discussed above in connection with the example method 200 or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for incorporating antenna radiation patterns in machine learning-based wireless planning (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   creating, by a processing system including at least one processor, a geospatial model of an environment in which a cellular network is to be deployed;
   transforming, by the processing system for each cellular antenna of a proposed antenna layout of the cellular network, a radiation pattern of the each cellular antenna into a signal strength array, to create a plurality of signal strength arrays;
   augmenting, by the processing system for each signal strength array of the plurality of signal strength arrays, the each signal strength array with at least one parameter of a corresponding cellular antenna of the proposed antenna layout and at least one value describing the environment in which the cellular network is to be deployed; and
   estimating, by the processing system, a coverage of the proposed antenna layout based on the signal strength array, as augmented, using a machine learning model.

2. The method of claim 1, wherein the geospatial model partitions the environment in which the cellular network is to be deployed into cells of equal size, and each cell is represented by one pixel of the geospatial model.

3. The method of claim 2, wherein the one pixel is associated with a value that indicates a height above sea level of the each cell and a classification that specifies a behavior of a ray traveling via an obstacle that is present in the each cell.

4. The method of claim 2, wherein the cells of equal size comprise square cells.

5. The method of claim 4, wherein the geospatial model comprises a grid of 256 pixels by 256 pixels and represents one square kilometer of the environment in which the cellular network is to be deployed.

6. The method of claim 1, wherein the transforming comprises:
computing two two-dimensional maps of a three-dimensional shape representing the radiation pattern of the each cellular antenna, to indicate a signal strength of the each cellular antenna in different directions; and
computing, for each pair of an azimuth angle and a polar angle in the two two-dimensional maps, an estimated signal strength.

7. The method of claim 6, wherein a first two-dimensional map of the two two-dimensional maps represents a northern hemisphere of the each cellular antenna, and a second two-dimensional map of the two two-dimensional maps represents a southern hemisphere of the each cellular antenna.

8. The method of claim 6, wherein the estimated signal strength is computed by multiplying a signal strength value for the azimuth angle by a signal strength value for the polar angle.

9. The method of claim 8, wherein each of: the signal strength value for the azimuth angle and the signal strength value for the polar angle is normalized to fall within a range of [0, 1].

10. The method of claim 6, wherein the two two-dimensional maps represent a horizontal plane and a vertical plane, and wherein sizes of power vectors that are not on the horizontal plane or the vertical plane are computed based on bilinear interpolation.

11. The method of claim 1, wherein the at least one parameter of a corresponding cellular antenna of the proposed antenna layout comprises at least one of: an azimuth of the corresponding cellular antenna, a height of the corresponding cellular antenna, a tilt of the corresponding cellular antenna, a sector of the corresponding cellular antenna, and a frequency of electromagnetic radiation emitted by the corresponding cellular antenna.

12. The method of claim 1, wherein the at least one value describing the environment in which the cellular network is to be deployed comprises at least one of: an elevation or a clutter.

13. The method of claim 1, wherein the machine learning model is trained using cellular antenna coverage patterns for a plurality of different cellular antenna parameters and a plurality of environments having different geospatial features, and wherein the cellular antenna coverage patterns are generated using ray tracing.

14. The method of claim 13, wherein the estimating is performed without using ray tracing for any cellular antenna of the proposed antenna layout.

15. The method of claim 13, wherein the machine learning model comprises at least one of: a deep learning model or a neural network.

16. The method of claim 1, further comprising:
estimating an interference of the proposed antenna layout based on the signal strength array, as augmented, using the machine learning model.

17. The method of claim 1, wherein an output of the machine learning model comprises a multi-dimensional array, and wherein each pixel of the multi-dimensional array comprises a value representing a level of an interference at the pixel and a value representing an electromagnetic signal strength at the pixel.

18. The method of claim 1, wherein at least one cellular antenna of the proposed antenna layout is mounted on a moving vehicle or is able to change tilt or transmission power in real time.

19. A non-transitory computer-readable medium storing instructions which, when executed by a processing system including at least one processor, cause the processing system to perform operations, the operations comprising:
creating a geospatial model of an environment in which a cellular network is to be deployed;
transforming, for each cellular antenna of a proposed antenna layout of the cellular network, a radiation pattern of the each cellular antenna into a signal strength array, to create a plurality of signal strength arrays;
augmenting, for each signal strength array of the plurality of signal strength arrays, the each signal strength array with at least one parameter of a corresponding cellular antenna of the proposed antenna layout and at least one value describing the environment in which the cellular network is to be deployed; and
estimating a coverage of the proposed antenna layout based on the signal strength array, as augmented, using a machine learning model.

20. A device comprising:
a processing system including at least one processor; and
a computer-readable medium storing instructions which, when executed by the processing system, cause the processing system to perform operations, the operations comprising:
creating a geospatial model of an environment in which a cellular network is to be deployed;
transforming, for each cellular antenna of a proposed antenna layout of the cellular network, a radiation pattern of the each cellular antenna into a signal strength array, to create a plurality of signal strength arrays;
augmenting, for each signal strength array of the plurality of signal strength arrays, the each signal strength array with at least one parameter of a corresponding cellular antenna of the proposed antenna layout and at least one value describing the environment in which the cellular network is to be deployed; and
estimating a coverage of the proposed antenna layout based on the signal strength array, as augmented, using a machine learning model.

* * * * *